United States Patent Office 3,128,366
Patented Apr. 7, 1964

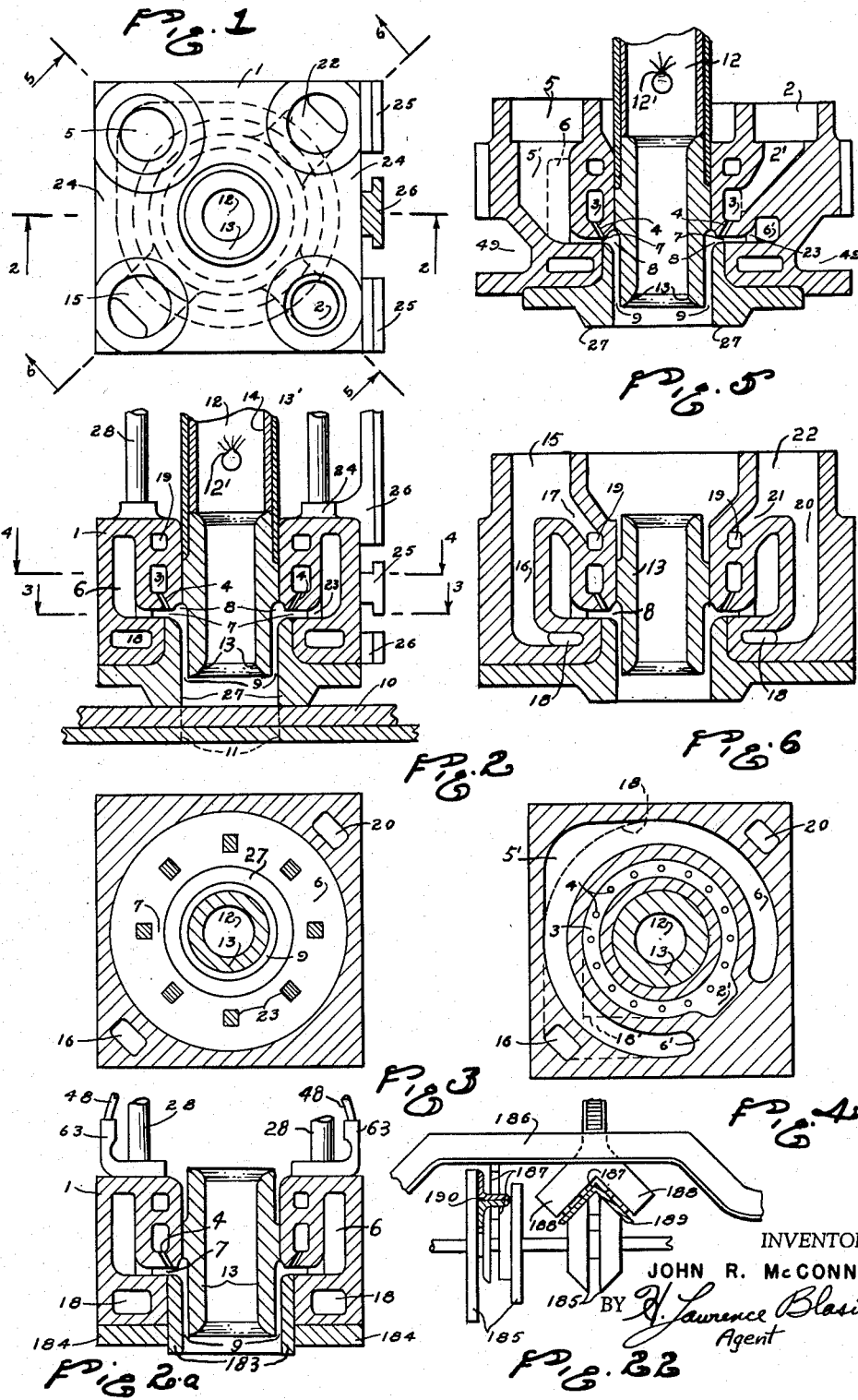

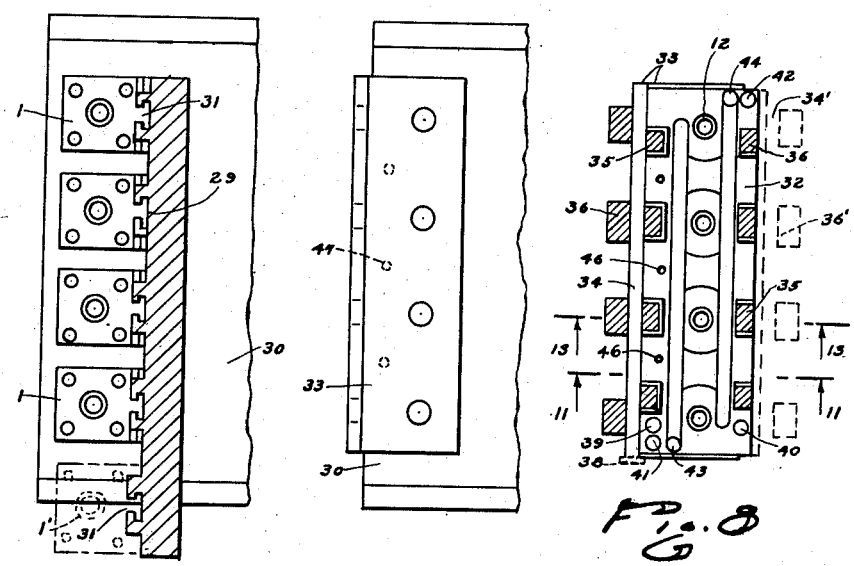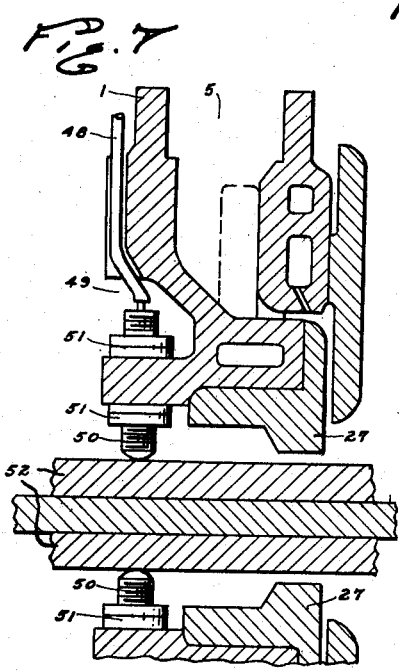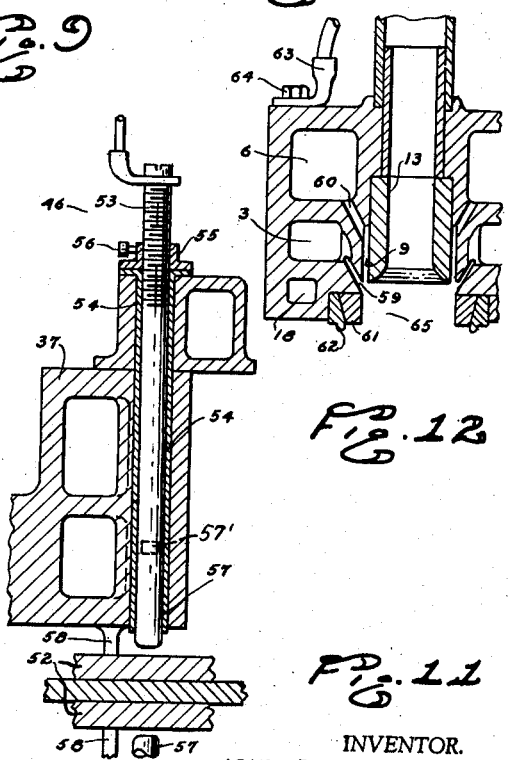

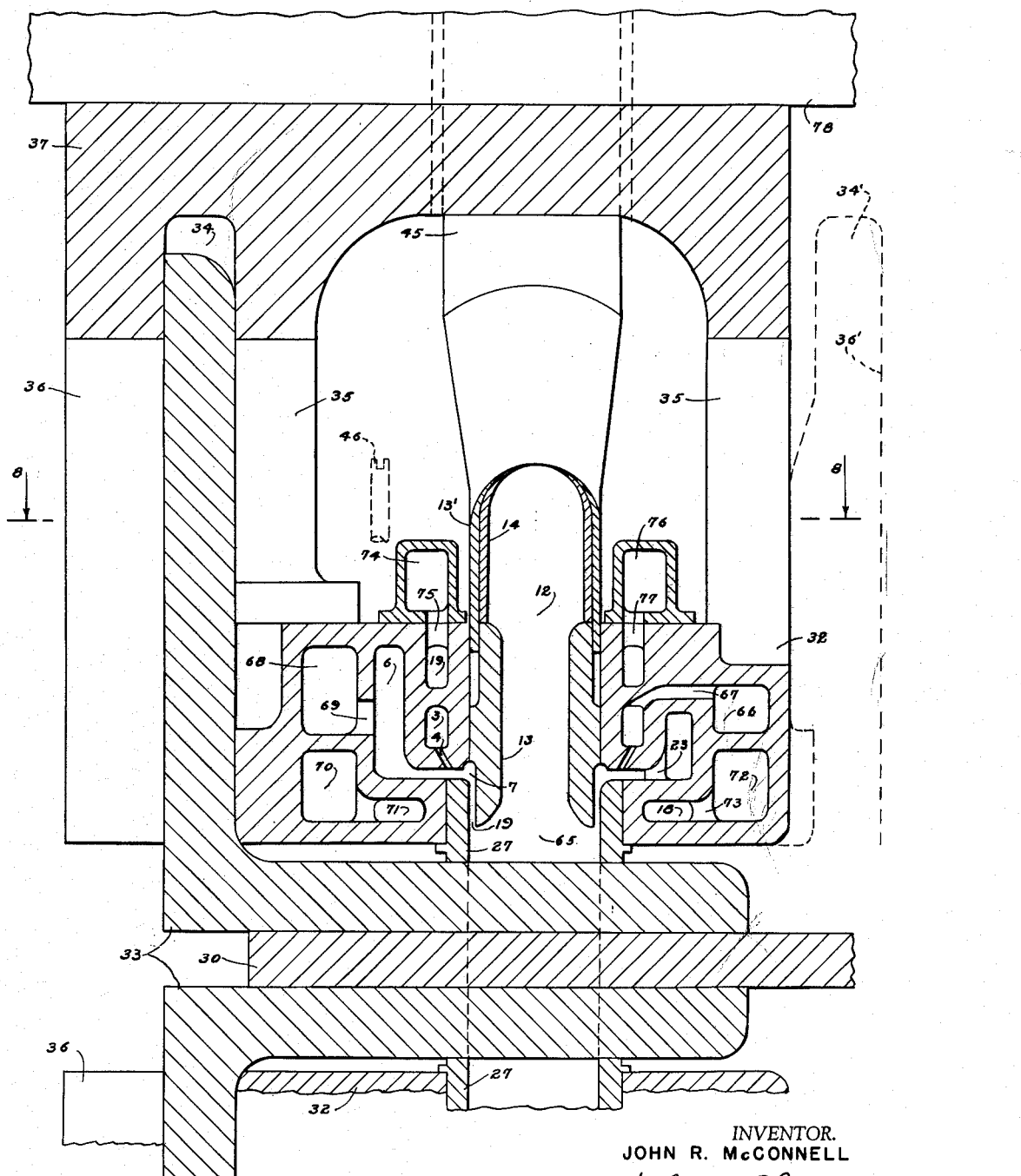

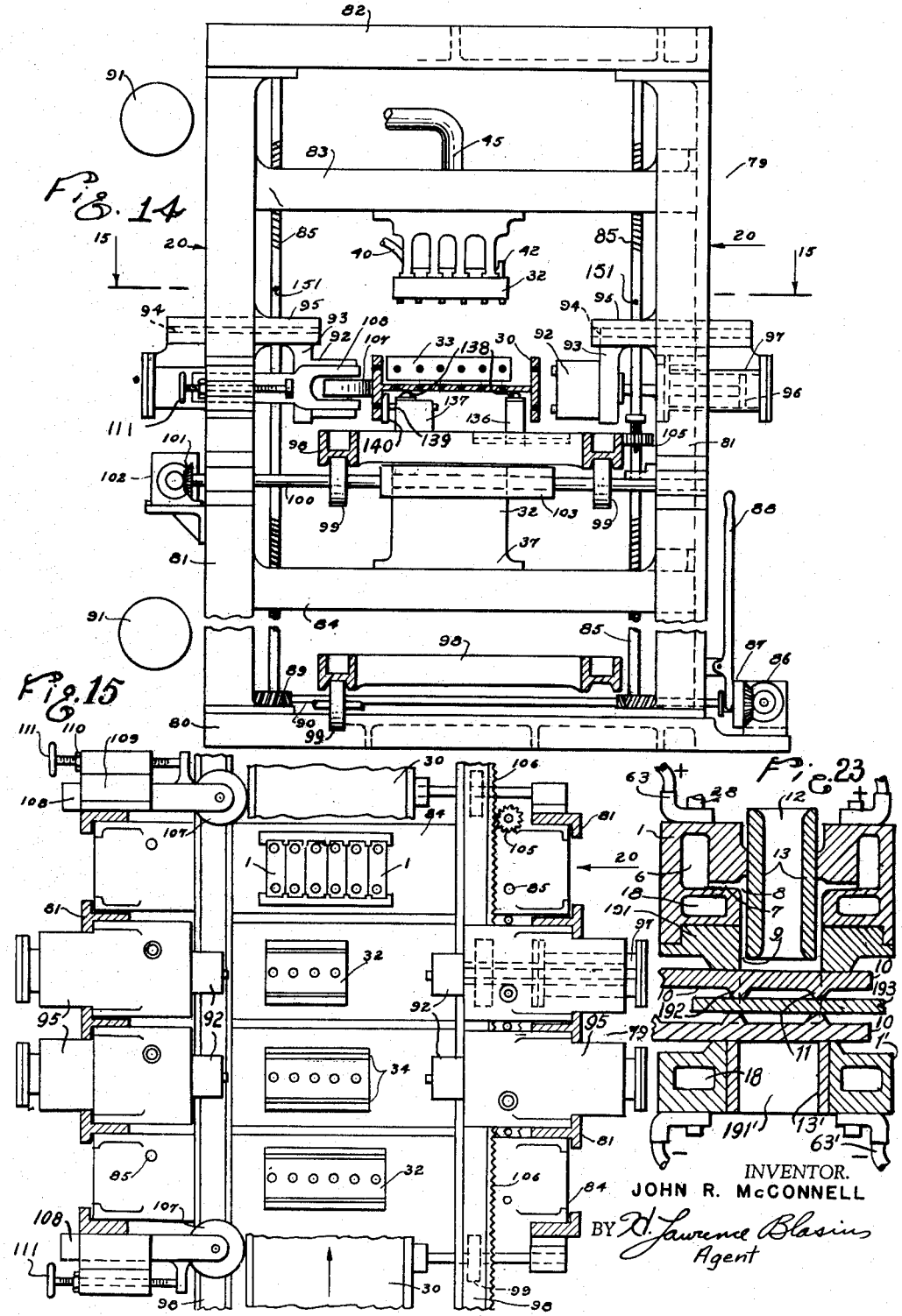

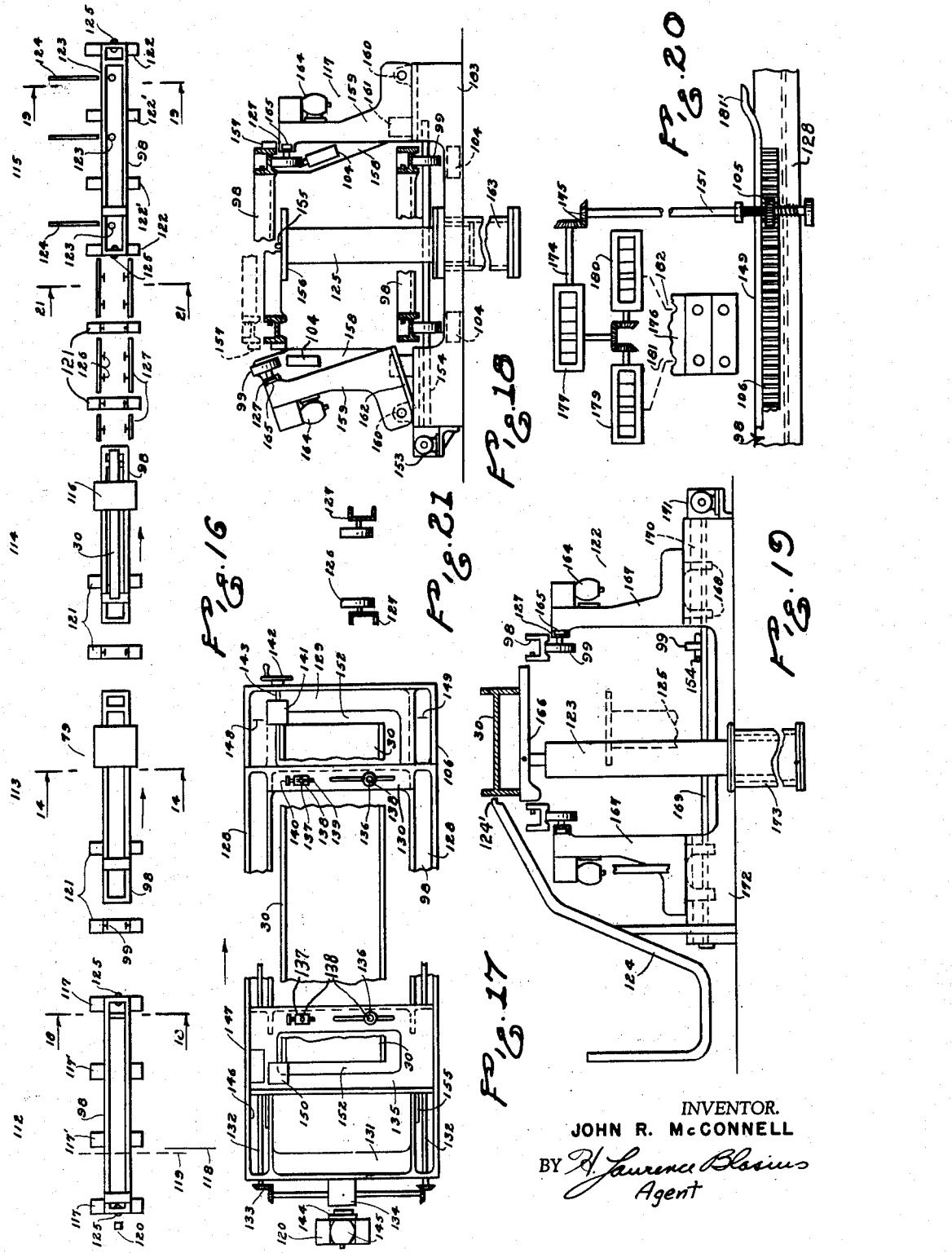

3,128,366
FABRICATING OF STRUCTURAL STEEL
MEMBERS OR UNITS
John R. McConnell, 148 Woodside Ave., Ridgewood, N.J.
Filed Aug. 28, 1959, Ser. No. 836,793
6 Claims. (Cl. 219—78)

This invention relates to machine tools and, more particularly, to a machine for flame-punching holes through steel shapes, tack welding the shapes together, and mechanically securing bolts or rivets within the punched holes to finally secure the shapes together.

It is an object of the present invention to provide apparatus for gas cutting holes through structural steel shapes with substantial accuracy, greater ease, and at an increased rate of speed.

Another object of the present invention is to provide apparatus for lightly tack welding minor shapes to the main structural steel shape, to position and retain the shape temporarily while being gas punched and finally secured together.

Another object of the present invention is to provide apparatus for substantially automatically riveting and bolting steel shapes together, to facilitate the handling, movement, measuring, positioning, and withdrawal of a completed fabricated member, and to substantially reduce the amount of hand operations ordinarily required therefor.

Still another object of the present invention is to provide a semi-automatic machine for completely fabricating steel shapes in a single continuing passage without rehandling, including the riveting of all assemblies and details, the precise fitting of bolts and rivets in provided openings, the punching and reaming such holes, and installing precision contact friction bolts therewithin, where specifications require riveting or bolting.

A further object of the present invention is to provide a readily adjusted machine for quickly and economically fabricating various types of structural shapes with or without duplicating operations, of varying sizes and lengths, and without time consuming interruptions between operations.

A still further object of the present invention is to provide gas and slag evacuating means in a machine of the above type which will conduct waste gases and slag away from the work piece during the flame-punching or gas cutting of the structural shapes, thus providing for precisely located and true shaped holes in structural members suitable for riveting or close fitting bolts.

Still further objects of the invention are to provide a structural shape fabricating apparatus bearing the above objects in mind, which is of simple construction, has a minimum number of parts, is inexpensive to manufacture and efficient in operation.

For still further objects and for a better understanding of the invention, reference may be had to the following detailed description taken in conjunction with the accompanying drawing, in which:

FIGURE 1 is a top plan view of the flame-punching unit made in accordance with the present invention;

FIGURE 2 is a transverse cross sectional view taken along line 2—2 of FIGURE 1;

FIGURE 2a is a modified type of electrical welding apparatus, somewhat different from that shown in FIGURE 2;

FIGURE 3 is a lower cross-sectional view, taken along line 3—3, of FIGURE 2;

FIGURE 4 is a transverse cross-sectional view taken along line 4—4 of FIGURE 2;

FIGURE 5 is a vertical cross-sectional view taken along line 5—5 of FIGURE 1;

FIGURE 6 is a vertical cross-sectional view taken along line 6—6 of FIGURE 1;

FIGURE 7 is a top plan view of a plurality of assembled punching units carried upon a support for punching holes in the end of a structural shape;

FIGURE 8 is a plan view, partly in section, of a one piece multiple flame-punch and tack welding block and supporting fixture made in accordance with the present invention;

FIGURE 9 is a side view of the end of a structural shape having connecting angles attached to both sides of the web, with holes flame punched through the assembled shapes in accordance with the present invention;

FIGURE 10 is a fragmentary cross-sectional view of a slightly modified form of punching block;

FIGURE 11 is a fragmentary vertical cross-sectional view taken along line 11—11 of FIGURE 8, showing a carbon arc tack welding device forming another part of the present invention;

FIGURE 12 is a modified form of construction of the apparatus shown in FIGURES 2 and 3, showing a carbon arc post mixing gas apparatus for electrical resistance, forge, rim, and tack welding;

FIGURE 13 is an enlarged transverse cross-sectional view of a flame-punching and tack welding block, taken along line 13—13 of FIGURE 8;

FIGURE 14 is an end elevational view of a fabricating machine equipped for flame-punching and tack welding made in accordance with the present invention;

FIGURE 15 is a sectional plan view taken along line 15—15 of FIGURE 14;

FIGURE 16 is a diagrammatic operating layout of the machine made in accordance with the present invention;

FIGURE 17 is a detail plan view of a shape carrying carriage forming another part of the present invention;

FIGURE 18 is an end view of a unit for elevating and propelling the carriage, forming still another part of the present invention;

FIGURE 19 is a combined end view of apparatus for discharging completed members and lowering the structural member carrying carriage;

FIGURE 20 is a diagrammatic detail elevational view of apparatus for locating the processing operations along the length of the structural shape;

FIGURE 21 is a fragmentary cross-sectional view of supporting transmission apparatus for conveying loaded shape carriers;

FIGURE 22 is a fragmentary cross-sectional view of roller members forming a part of the present invention; and FIGURE 23 shows a modified form of the construction of the apparatus shown in FIGURE 1, substituting electric carbon arc heating for the combustible gas.

In accordance with the present invention, any kind of heating and cutting process may be used for the hole cutting operations while acetylene and oxygen are generally preferred and are referred to in the following specification. In the claims they are referred to generally as combustible and combustion supporting gases. The mixed heating gas may be pre-mixed or post-mixed relative to the pressure nozzle outlet. Thus, after the material to be treated is brought up to the required temperature, such as a red heat or higher, the heating gas is shut-off and oxygen, alone, under pressure is used to continue oxidation and removal of the material to be eliminated. With the gas cutting body contacting the flat surface of the material being treated, the issuing waste products of combustion effectively close the exhaust tube to the atmosphere, thus creating virtually a closed space or burning chamber wherein the steel will burn with the continued feeding of oxygen alone. As a result, without the flow of acetylene, the pressure and volume of oxygen and the temperature of the metal can be carefully varied and controlled in a fairly wide range, thus avoiding the danger of flame propagation or flash back so that acetylene is further economized.

Where structural shape units are to be assembled by riveting or bolting, a leg of an angle or the flange of a T- or I-beam is generally mechanically punched or drilled and riveted or bolted to the main shape, generally in pairs, one on each face. Rigid specifications often call for matched drilling or reaming for precision fitting of parts. The flame-punching operation provided by the present invention is an equivalent to such matched drilling or reaming operations, and the holes resulting therefrom may be used to receive precision bolts. Three separate pieces can also be tack welded in accordance with the present invention into a unit assembly, and flame-punched in one connected operation.

In accordance with the present invention, angle members to be applied to the main structural shape can be held in slots in the flame punching heads and are spot or resistance tack welded to the main shape by short welding rods projecting from the underside of the head, immediately before the flame-punching operation, following which the gas flame-punching operation may be performed as a combined and continuing operation. With the angle members lightly attached, the flames cut precise holes through as many as three united pieces, following which they are ready for riveting or bolting. For example, in the attachment of a seat angle to a column, the same head can flame-punch the holes for the loose cap angle of the seat and cap angle connection which may be fifteen or eighteen inches apart. While the drawings do not illustrate this in detail, it will be apparent that this operation can be performed on all four faces of the column simultaneously, or in immediately succeeding operations. Thus a doubled dual compound operation is effected.

Since the burning and heating gases are uniformly mixed, in accordance with the present invention, and are directed toward the shapes by an annular slot means formed from a smooth cutting tube wall and a concentric head wall, a precise hole with smooth uniformly cut wall and rims is attained in exactly the desired location by the machine. The slag and exhaust gases are expelled outwardly through a central exhaust port, through a discharge tube aided by compressed air directed at an angle upwards into the interior of the discharge tube from a compressed air nozzle in the draft tube that helps to cool the gases and the tube, whereby the discharge may be directed into a separating collector that collects the slag and vents the gases at a convenient point remote from the work area. This avoids fused slag spatter on adjoining smooth areas of the work piece and machine tool, further avoiding dust and dirt and danger to personnel from hot metal, poisonous fumes, and fire hazards.

As will be hereinafter more fully described, the punching units of the present invention may be used as single units or in multiple, as the case may be. Each group of punching units may include a one piece rigid assembly, or each unit may be independently brought into group action according to the number of holes required. The holes in the structural members are of generally standardized patterns with specific spacing and pitch therebetween. Also, structural holes are generally round, while slotted holes can be used for expansion and sliding connections and for slot welding. By using suitably shaped dies, slotted, oval, square, rectangular, and other shaped holes may be flame-punched in a similar manner, and holes may also be burned with their axes less than ninety degrees to the member, as in stair rails and ornamental iron work.

By flame punching is meant: the flame heating and oxygen removal of metal, forming a comparatively small hole through an element of a structural shape or plate, wherein the entire area of said hole is removed simultaneously by a cutting flame covering the gross area of said proposed hole, or by a closed ring of flame slotting through the metal coincidentally at the boundary of said hole, precisely shaped and guided by a flame-confining tube, removing the entire area of metal, principally for the insertion of rivets or bolts. The method is also applicable to the piercing of small slots, elliptical, and rectangular holes, for slot welding holes or for the passage of intersecting through rods. The tack welding method, an element of the combined tack welding and flame burning combination, is a localized application of the compound chain welding feature of applicant's co-pending application Serial No. 563,662.

For technical explanations, reference is made to the "Manual of Steel Construction" of the American Institute of Steel Construction, which is the generally recognized authority on steel fabrication and construction. This organization sets forth the standards and dimensions that are generally used throughout the United States. In the 1955 edition, pages 12 to 31, and page 160, the various factors taken into consideration in the fabricating of steel shapes in accordance with the present invention are set forth in detail. The die blocks illustrated by this invention in FIGURES 7 and 8 of the drawing, the fabricating unit of FIGURE 14, and the machine layout of FIGURE 16, are based upon these accepted standards. It will thus be noted that the fabricator in FIGURE 14 is equipped with standardized flame-punching blocks and flame-punching, tack-welding blocks to primarily process reasonably deep girders with holes in all four faces and connection angles on two web faces. So equipped, the apparatus will economically process sizes of from fifteen inch to twenty-four inch shapes, with any mixture and complications of sizes, varying dimensions, lengths, and holes. Virtually, this apparatus is a jobbing welder for the production of girders and beams with few or no duplications. By substituting other blocks, this apparatus can handle the largest or smallest sizes of shapes, and with a minimum number of such blocks, it can punch all sizes of beams. With still further adaptations the apparatus can also fabricate columns and plate girders including those with cover plates. The apparatus can also be adapted for handling and fabricating a plurality of individual angles or paired angles, such as that shown in FIGURE 22.

Referring now more in detail to the drawings, and more particularly to FIGURE 1 thereof, a flame-punching copper casting cutting blocks or body 1 having an acetylene inlet port 2, an oxygen inlet port 5, and cooling water port 15, is shown to also include a heated outlet water port 22 and exhaust gas riser 12. The flame-punching body is contacting a steel plate 10 to be pierced to form a hole 11.

With reference now to FIGURES 2, 5 and 6 of the drawing, the flame-punching body 1 includes an acetylene inlet port 2 having a downcomer passageway 2' that communicates with a circular distributing manifold 3 having drilled outlet holes 4 in the bottom wall thereof. The oxygen inlet port 5 admits oxygen under pressure to the oxygen downcomer 5', from which it flows right and left to circular distributing manifold 6 having a manifold reducing section 6', so as to pass under the acetylene downcomer 2'. From the circular manifold 6, the oxygen flows radially inwardly toward the center of the casting through a continuous narrow horizontal radial passage 7, past the multiple acetylene nozzles 4. On striking an annular mixing chamber 8, the gases mix and are deflected down the continuous circular cutting nozzle 9 in a uniform circular sheet against the metal work plate 10, or other surface from which a circular area is to be heated and blown out, to form a hole 11 with a smooth uniformly cut wall and edges. The outline of the hole is determined by a replaceable threaded carbon or ceramic lining sleeve 27 that protects the casting at the point of high temperature and adapted to carry a sparkplug or pilot light serving to ignite the gases.

During the cutting of the hole, the slag particles and exhaust gases are reflected by the plate and pass upwardly through the exhaust port 12 with the casting protected and insulated from the extreme heat by the axially-threaded carbon or ceramic tube 13 that also confines and helps to direct the active gases in the proper manner. Above this, is a carbon liner 14 encased in a copper or brass tube 13' of FIGURE 2, conducts waste product to suitable receiver means previously mentioned. A compressed air nozzle 12', FIGS. 2 and 5, may be directed upwardly in this exhaust tube 13' at an angle thereto at a point spaced above the top of the casting to augment the exhaust action.

As is shown in FIGURE 2, the flame-punching casting body 1 includes tapped bosses 24 for bolting a plurality of such castings in multiple to an overhead horizontal platen fixture. Horizontal T-keys 25 serve to adjustably connect the castings to a horizontal channel support, whereby a number of holes punched at a time and the particular space therebetween may be varied. Similar T-keys 26 are also provided so additional cutting blocks can be brought into operation to increase the number of holes punched at one time. Guide rods 28 are inserted into the bosses 24 for vertical manipulation of individual cutting blocks by lever, piston, or the like. However, flame-punching blocks are generally positioned so as to oppose each other on opposite sides of the work piece. A carbon cutting sleeve 27 is fitted into the open bottom face of the casting 1 to heat insulate the casting body metal.

In FIGURE 2a, a slightly modified form of construction is shown wherein two electric cables 48 of similar polarity are connected to terminal lugs 63 attached to the threaded bosses 24 on the casting cutting block 1. This arrangement makes it possible to use the apparatus with opposing apparatus of opposite polarity. The carbon cutting sleeve 27 of the first form of the invention is replaced by a copper-tungsten higher compressive conductance sleeve 183 which is of relatively higher strength than the carbon sleeve. If desired, any other material may be used which has a high melting point, high conductivity and high compressive strength. This sleeve is used as a combined contact electrode and forging tool with considerable pressure being applied against it for effecting an electric resistance or forge rim weld. Cooling ports 18 are enlarged and an insulating washer 184 is provided. This assembly may be used for gas flame-punching, gas flame spot welding, contact electric resistance spot welding, gapped flash electric resistance forge welding, electric pre-heat and oxygen cutting of holes without the use of combustible gas. Some of these operations can be performed with the sleeve 183 held near but spaced from the steel plates for a short time at the start of the operation.

As is shown in FIGURES 2 and 3 of the drawing, an oxygen ring aperture or radial 7 is provided at the upper level of the carbon sleeve 27, with vertical ribs 23 strengthening the casting body 1 where the oxygen ring manifold 6 is formed.

FIGURE 4 illustrates the relationship between the acetylene ring manifold 3 and downcomer 2', at one level, and multiple drilled outlet ports 4 that discharge into the ring aperture or radial passage 7 of the device shown in FIGURE 3. The oxygen manifold 6 is also provided with a reduced section 6', while circulating water cooling ducts 18 are shown on one-half of the unit below the level of the aceytylene ring manifold 3 which are split to opposite sides near the point of the duct 18'. In FIGURE 6, the diagonal cross-section of the casting illustrates the circulating water cooling inlet port 15, downcomer 16, lower ring duct 18, and the split downcomer 17 that feeds the upper ring duct 19. The lower duct 18 feeds the now heated water to the riser 20, and outlet port 22, as the upper duct 19 feeds from another duct 21 to also exit at port 22, FIG. 6.

Referring now more specifically to FIGURE 7 of the drawing, an assembly of similar flame-punching bodies 1 of the type illustrated in FIGURES 1 to 6, are shown mounted on a vertical guide support 29 that is held in a machine for punching holes in the end of a web of a beam 30 with a fifth punching body 1' withdrawn therefrom. Slots 31 determine the spacing between the holes made by the assembly, but this spacing may be varied simply by using a different supporting fixture. As shown, the device may be used to punch any size beam up to twenty-one inches deep, and thus will take care of many multiple punching operations, including lengthwise multiple punching of angles for riveted plate girders.

In FIGURE 8, there is shown in sectional top plan a one piece, multiple group, flame-punching block 32 with a connection angle 33, with a retaining slot 34 and with provision made for tack welding such connection angle to the main shape. Referring also to FIGURE 13 of the drawing, it will be noted that downwardly projecting legs 35 of supporting fixture 37 carry the flame punching block 32 proper, while projecting tongues 36 steady and retain the connection angle 33 in retaining slot 34. The limiting stop 38, FIG. 6, positions the angle relative to the main shape, for proper connection thereto. Thus, oxygen flows into an oxygen port 39 and acetylene is admitted through a port 40, with the cooling water entering through the ports 41, 43. Heated water is withdrawn outwardly through outlet ports 42, 44, while waste gases and slag are vented outwardly through the discharge ports 12. A tack welder 46 is shown in FIGURE 11 of the drawing for temporarily securing the parts together preparatory to the main fastening operations.

As is shown in FIGURE 9 of the drawing, connection angles 33 are tack welded at 47 to the end of the main shape 30 and holes are flame-punched through the three assembled shapes. With reference to FIGURE 13 of the drawing, it will be noted that simultaneously acting and matched flame-punching blocks 32 perform the same operation on each side of the main shape while tack welds 47 of FIG. 9 temporarily secure the parts together.

FIGURE 10 illustrates a detail of the corner of the flame-punching block 1, showing the manner in which the tack weld pins are incorporated in an individual punching unit. An insulated conductor 48 leads into a recess 49 in the corner of the block below the oxygen inlet port 5, and is connected to a non-consumable welding electrode pin 50 and insulated from the main body by non-conducting sleeves and washers. The pin 50 projects below the level of the carbon boundary sleeve 27 and is locked by nuts 51 to the casting body 1 and bears heavily upon the assembled triple steel shapes or plates 52. It is similarly opposed by corresponding apparatus forming the opposite leg of the welding circuit and bearing against the underside of the assembled plates 52. Thus, with the passage of current through the pins, the pins slowly sink into the steel, tack welding the same together until the carbon sleeves 27 contact the steel whereupon the current is discontinued and the flame-punching operation is commenced. This apparatus is used for web shear plates, filler plates, and stiffener angles.

Referring to FIGURE 11 of the drawing, which is a sectional view of FIGURE 8, the tack welder 46 is more clearly shown. A threaded copper alloy rod 53 extends through the punching block 37 and is insulated by a sleeve 54 therefrom. The rod 53 is threaded through a ferrule 55 at the top and is locked in position by a screw 56. A carbon stub 57 is threaded by a reduced end 57' to the lower end of the rod 53 and is gapped a small distance above the level of the pressure lug 58, resting upon the steel plates 52 to be welded, said carbon end being level with the boundary sleeve 27. Similar apparatus with carbon studs 57 bears against the steel plates on the opposite side, so that upon energization, arcs are created between the electrodes and the steel with considerable welding heat. The pressure lugs 58 forge the weld.

FIGURE 12 illustrates a modified form of punching unit 1, in which the possibility of flame propagation or flash back is minimized by the post mixing of the heating gases. With the mixing occurring under little or no pressure, or even in a light vacuum induced by a draft, greater latitude is permitted in manifold pressures. A circular acetylene manifold 3 allows gas to discharge through a continuous slot 59 into the cutting area or burning chamber 65 where it mixes with oxygen from the manifold 6 issuing from drilled holes 60, downwardly through circular gas cutting slot 9. The circular sheet of mixed heating gases directed against and confined by the inserted carbon sleeves 61 impinges upon the steel plate, bringing it to a suitable cutting temperature. Set within the interior of the casting, is a circular ring 62 of high heat conductivity and having a high melting point, is provided with a continuous circular projecting ring providing one wall of the gas cutting slot. The carbon sleeve 61 is set within the circular ring 62, while an electrical cable terminal lug 63 is fastened to the casting by a nut 64 and forms one leg of a circuit with opposing apparatus (not shown), thus completing the circuit to tack weld contacting steel shapes or plates together by means of a circular ring 62. This punching-block is cooled by a water passage 18 through which water is circulated and is insulated from the supporting machine in a manner not specifically shown.

In actual operation, the electrical resistance forge ring welding is performed first until the welding ring sinks into the steel bringing the inserted carbon sleeve 61 into contact with the steel surface, following which the heating gases are applied and finally, oxygen alone is supplied to perform the final cutting in the manner hereinbefore described. The tack welding adds considerable strength to the finally riveted or bolted joint, as will be readily recognized by those skilled in the art.

Referring now to FIGURE 13 of the drawing, which is a cross section taken through the device illustrated in FIGURE 8, there is shown upper platen 78 of a machine carrying the fixture 37, to which the one piece multiple punching casting 32 is attached. This punching device is merely an assembly in a one piece casting of plural circular gas cutting slots such as shown in FIGURES 1 to 6, to which reference is now also made. A transverse distributing acetylene manifold 66 feeds each punching unit inwardly through passageways 67. A transverse oxygen manifold 68 feeds each unit inwardly through ducts 69. A lower cooling water manifold 72, likewise extending across the width of the casting block 32, supplies water to all the units through a duct 71, with the heated water issuing through passages 73 in communication with the duct 18 which leads to an outlet riser. Upper cooling water manifolds 74, 76 communicate through ducts 75, 77 with the casting block to cool the upper part thereof. A retaining slot 34 for a connection angle 33 is provided in the supporting fixture 37 which is either a permanent magnet or a coil energized magnet for temporary retention of the angle member 33. Legs 35 support the casting block, while the tongues 36 position the angle 33, placed in pressurized contact with the web of an I or H shaped member such as a girder. A tack welding rod 46 is disposed at the rear of the assembly, FIGS. 8 and 11. In use, the central exhaust duct 45 collects waste gases and slag from exhaust ports 12 through a multiple pronged Y duct and discharges them through telescoping or bellows type connections to a disposal duct 91, as shown in FIGURE 14. A similar punching block 32 disposed on the opposite side of the shape provides a reaction against which upper block 32 reacts, FIG. 14.

As shown in FIG. 13, the apparatus is set to simultaneously cut and secure angles to only one end of a shape, without reversing the shape. If a second slot 34' with retaining tongues 36' is added to the punching block 32 while the same distance from the center of the cutting port 65 as to the back of the reversed angle is maintained, the block can also be used to cut and secure a connecting angle to the other end of the beam or girder 30, FIG. 8, as the beam is moved to have the punching block aligned therewith.

In FIGURE 14, a flame-punching tack welding machine tool 79 is shown to have a base plate 80, multiple vertical posts or supports 81, and a cap plate 82 joining their upper ends. Guided by the posts are separate multiple upper and lower platens 83, 84 retracted or converged upon the main shape by left and right handed threaded rods 85. These rods are rotated by a geared motor 86 through a clutch 87 operated by a lever 88. Worm and pinion gears 89 and an associated shaft 90 transmit the power from the clutch 87 to the threaded rods 85. Matched and opposed flame-punching, tack-welding blocks 32 are mounted on each of three upper and lower platens having dual connection angle retaining slots for fabricating various size girders. On the fourth platens, are mounted a plurality of twin hole punching units, which is a doubled version of the solitary hole unit 1 as shown in FIGURE 1. These are mounted in vertical guides and any number of units can be brought into related group operating position by means of levers. Utility type service connections 40, 42, 45 are also shown which add to the usefulness of the present apparatus, FIG. 14. These punching blocks are used to flame punch all types of intermediate standard pattern hole connections for beams and girders. Trunk waste ducts 91 are also provided for increasing the efficiency of the apparatus.

A similar, stationary, twin holed adaptation 92 of the punching block 1 is mounted upon a ram 93 T-keyed at 94 into a supporting slide 95 that is located between intermediate posts 81. This punching block 92 is projected or retracted by a piston 96 carried within a hydraulic cylinder 97, and is used for punching hole connections in the flanges of the girder 30.

In actual use, the shape is carried through the machine by a rigid carriage frame 98 that is propelled by wheels 99 carried upon a shaft 100. A gear train 101 and motor 102 provides intermittent forward and backward movement of the carriage for locating or spotting the shape relative to the punching apparatus. The carriage is stopped at the precise location by brake and other commercially available controls (not shown). A coil magnet 103 on a shaft as shown in FIG. 14 or twin magnets 104 under the wheels as shown in FIGURE 18, by magnetic attraction increase the tractive effort of the wheels and assist in accelerating and decelerating the carriage frame with minimum amount of slippage. A roller 99 supporting carriage and the magnetic attraction off the magnet 103 prevents derailing of the equipment during high speed operation, even when the path is not exactly level or aligned. The cooperation between these parts is also shown in FIGURE 15 of the drawing. This figure shows a roll 107 on adjustable bar 108 that is mounted in a housing 109 and positioned by a hand wheel 111 having a lock nut 110. This roll device maintains the desired distance of the flange of the girder shape relative to the punching block 32.

FIGURE 16 illustrates a diagrammatic operating layout for a complete fabricating machine made in accordance with the present invention. This machine has in sequence a loading station 112 for various types of steel shapes, a tack welding and flame punching station 113, a riveting and bolting station 114, and finally a discharge station 115 is at the opposite end thereof. The transmission and conveying system includes a plurality of carriage frames 98 propelled by supporting wheels 99 and upon which the raw shapes 30 are supported and transported to the various fabricating machines 79, 116, on an upper level, while the empty carriers 98 are returned on a lower level transmission system further shown in FIGURE 14. In operation, an empty carriage arrives at a lower level station 112 and is elevated to an upper processing level by an elevating piston 125 of the apparatus 117 shown in FIGS. 16 and 18. Such carriages are supported in such elevated position by associated similar apparatus 117, 117'. The raw shape is removed from the skids 118 by a light overhead bridge crane 119 and is placed upon the carrier frame 98, adjusted, and secured thereto. This carrier flame 98 is shown in greater detail in FIGURE 17. The loaded carrier is then propelled to the tacking and punch welding station 113 by means of powered wheels 99. A propulsion apparatus 121 shown along the travel path is base mounted, powered, has vertically-extending, propulsion standards, and is an adaptation of the apparatus 117 of FIGURE 18, described hereafter. Extending between and beyond these propulsion apparatuses 121 are twin transmission channels 127 shown in FIGURE 21 carrying idler carriage supporting wheels 126, FIG. 16. Although these extend along the full travel path, for purposes of clarity, they are illustrated only between the stations 114, 115.

Upon completing the punching and tack welding operations at the punching-tack welding station 113, the shape is forwarded to the riveting and bolting station 114 for further processing or fabricating. Following the completion of the processing at the riveting and bolting station 114, the shape is a completely fabricated member ready for discharge at the discharge station 115 for shipping. Although only two actual fabricating stations have been illustrated, it will be apparent that other processing stations may be included for reaming, broaching, grinding, and for coping-blocking-cutting beam ends by commercially available guided cutting flame torches. Upon arrival at the discharge station 115, the shape clamps are released and the elevators 123, shown in FIGS. 16 and 19, elevate and dump the completed member into a collecting cradle 124. The elevator 123 is then retracted and elevator 125 lowers the empty carrier 98 to the lower travel path as standards 167 are diverged, for return to the initial loading station.

As is more clearly shown in FIGURE 17 of the drawing, the carrier frame 98 includes two parallel I shaped longitudinal rails 128 secured together at the front by two head ties 129, 130 having an access well 152 formed therebetween. These head ties support the head of the shape 30 being fabricated. At the rear end of the carriage, the frame is tied together by a single cross tie 131. A clamping cross frame or follower 135 with an access well 152 is adjustable from the rear end of the carriage frame by threaded rods 132, a gear train 133, and a speed reducer 134. Two upstanding blocks 136, 137 are mounted on this and the forward second head cross tie 130 for height and lateral adjustment. Large free rolling ball bearings 138 are retained within the heads of the blocks for supporting the shape 30. Through each top block are sprung rods 139 that carry a pad 140 to press the top flanges of the shapes firmly against the positioning roll 107, as best shown in FIGURE 14.

Roller 107 for lateral spacing of shape is a secondary precautionary means of exactly locating shape and may be dispensed with. The blocks 136 and 137 alone as described above are capable of positioning and maintaining the lateral spacing of the shape. Body of block 136 may be used to bear against inside face of flange or a pad 140 sprung or unsprung may be employed as originally stated. Blocks 141 and 150 additionally clamp the shape rigidly in position.

It is generally accepted practice in steel mills to furnish shapes 30 with a cutting length tolerance of one-half inch plus or minus. Therefore, fabricating shops order shapes one inch short to avoid having to recut the overall length of the shape in the shop. Short lengths are rejected. The end connection angles 33 are mounted on the shape 30 equally overhung at each end to secure the proper overall working length of the member. The problem is therefore always present to center the raw shape longitudinally during the fabricating process. This problem is overcome by providing an adjustable T-grooved block 141, FIG. 16 that is advanced by a hand wheel 142 and threaded rod 143. In actual use, a motor 145 mounted upon a stationary stand 120 and equipped with an extensible frictional magnetic clutch 144 engages the drive face of the gear box 134 and pulls back the clamping frame 135 in order to admit the shape 30. The cross frame 135 is then run forward to drive the front end of the shape against the front clamping block 141 set at zero length 148, 149. A guide 147, patterned after those in FIGURE 20, is set to coincide with the working face of the clamping block 150 and to show distance from zero point 148 with a pinion operating on the rack 146 to determine the length of the shape being treated. Half of the difference between the length of the shape and the finished length of the member is noted. The front clamp block 141 is then run back to the other side of the zero point 148 this determined distance by the hand wheel 142 in order to get the proper projection and the true length of the completed member. The clamping cross frame 135, which was slightly retracted, is then brought forward, clamping the shape in the proper position relative to the zero dimension. Then, the loaded carriage is ready to proceed to the processing stations.

A rack 106 is provided on the side of carrier frame rails 128 for measuring purposes explained in connection with a description of FIGURE 20. Several frames 98 with longer wells 152 are provided where additional fabricating is required close to the ends of the shape. When coping of the ends of the shape is required, regular clamping blocks may be retracted or removed and top latch, web contacting, end blocks are substituted. A retaining bar 155 is provided for clamping the follower 135, FIG. 17.

Referring now to FIGURE 18 of the drawing, the method of raising the carrier frames 98 is clearly illustrated. The carrier frames 98 are propelled into the station 112 by a motor reduction gear 153, shaft 154, and wheels 99. After being stopped by a limit switch, the piston 125 of the top bearing plate 156 and centering pin 155 elevates and contacts the head 129 and tail 131 of the frame 98, thus raising the frame. In actual use, the bumper blocks 157 on the frame engage the wing cams 158 on vertical standards 159 that are pivoted upon pins 160 thus widening the transverse distance between the standards 159 and allowing the frame 98 to be raised above the upper operating level. On passing this level, the standards drop back to a normal operating position, cushioned by a device (not shown), similar to an ordinary door closer check unit. Solenoid operated locks 161, FIG. 18, steady the grooved bottom 162 of the standard in the base 183. The piston 125 in the hydraulic cylinder 163 then descends depositing the frame upon the upper level drive wheels 99.

The carrier frame 98 is shown, FIG. 18, in the drawing in various sequential positions, initially entering at the lower level, supported in an elevated position by the piston with the standards moved to maximum width, near the top of its travel, and in a rest position at the upper level. Individual drive mechanisms 164 for each of the wheels 99 may be replaced by two longitudinal line drives with individual wheel power take off shafts. The transmission channel 127 has lug supports 165 and similar lugs and channels may be used to attach other supports to the bases 183, 172 for lower return travel of the carriages.

It will be noted that the machine apparatus 117' illustrated in FIGURE 16 has no piston and cylinder. Also, the machine apparatus 121 illustrated in FIGURE 16 is a rigid unit devoid of pivotal movement, a rigid, non-elevating version of the elevating and propelling unit shown in FIGURE 18 devoid of a piston and cylinder, but having power on one side only and an upper drive shaft extending across the unit, similar to that shown in the base of said FIGURE 18.

In FIGURE 19, an elevating and dumping piston 123 is slidably supported within a hydraulic cylinder 173 and is pivotally connected to a pivot bar 166. A notch 124' in the bar 166 engages a notch in the extended arm of the cradle 124 as the piston 123 is raised, thus causing the shape 30 to be slid off and dumped into the cradle. The piston 123 is then retracted below the lower transmission level, while the piston 125 is elevated to lift the carrier frame 98 off the wheels 99, as the motor 171, FIG. 19, is actuated to spread the sliding standards 167 transversely apart. These standards 167 are keyed by a key 170 to the base 172, and are operated by right and left hand threaded shafts 169 acting upon depending lugs 168 of the standards 167. As a result, the carriage frame 98 is then lowered to the lower operating level to be returned to the loading station 112. The machine apparatus 122' is identical to the machine apparatus 122, but is devoid of any piston and cylinder mechanism, FIG. 16.

The diagrammatic details illustrated in FIGURE 20 of the drawing, show means for determining the location of the center and the working points 181, 182 of any die, punching block, or other fabricating tool 176, at any station from the front zero end of the completed member 149 as compared to the front end of a row shape. The front end of the rack 106 attached to the carrier frame 98 will be set forward of the zero points 148, 149 shown in FIGURE 17, the same distance a multiple measuring drum dials control rod 151 is located forward of the center of the working positions which it controls and measures, plus an additional six inches. The main control indicating dial 177 reads 99'—6" when the pinion 105 is not in mesh with the crack 106 through the shafts 151, 174 and gears 175. As the carrier frame 98 approaches the first fabricating position, pinion 105 is brought down to engage the front end of the rack by a cam 181', FIG. 20. As the frame travels, the dials 177, 179, 180 at each operating position of the station register the exact dimensions hereinbefore described to the nearest one-sixteenth of an inch. When the frame passes beyond the rack, the pinion 105 is deflected upwardly out of engagement with the rack 106 and the main control dial 177 springs back to 99'—6" or actually, minus six inches. The main control dial 177 of the punching block 1 is shown in FIG. 20. The secondary or slave dials 179, 180 are geared to the main dial 177 and register the dimensions of half the effective working width of the punching block 1 plus and minus, respectively. Of course, an instantaneous up and down magnetic control of pinion unit may be substituted for this arrangement.

The machine apparatus 116 shown at the station 114 in FIGURE 16, is similar to the apparatus shown in FIGURES 14 and 15, and is fitted with independent attachable fabricating heads and devices for the insertion and holding of bolts and for the placing and tightening of nuts. This apparatus may include means for placing and bucking hot and cold rivets, and the upsetting and driving of the heads thereof. These fabricating heads may be mounted upon both the platens and the rams and may cooperate in various ways for operations upon both web and flanges of the structural members. Each head will be equipped with its own independent drive and required movements for rotary, reciprocating, extensible, and pulsating operations. All utility services required, such as gas, water, air, electricity, fluid pressure, and the like, will be provided at the machine. Multiple assemblies of commercially available nut runners or riveting units may be used, such as those illustrated in FIGURE 130 on page 157 of A.I.S.C., Manual of Steel Construction.

It will now be recognized that the machine illustrated in FIGURE 14, when equipped with suitable fabricating heads, can perform any fabricating, processing operation required in the complete preparation and finishing of the usual structural members for field erection. The machine unit 116 may be equipped, as shown in FIGURE 22, with a train of spaced stationary, angle supporting rotating rollers 185, with front and rear humped carriage ties 186, multiple draw jaws 187, and a plurality of varied inverted V, double flame punching blocks 188, that can simultaneously punch both legs of a plurality of angles 189. The machine can also tack weld, punch, and rivet paired contacting L-shaped members 190 or tack weld such members together. Commercially available, guided, cutting or welding torches may be substituted for irregular or special work.

FIGURE 23 shows a flame punching-tack welding block consisting of a metal body formed in general on the style of FIGURES 1 and 2A without combustible gas accommodations. Metal body 1 provides a circular oxygen distributing manifold 6, feeding radially through narrow flat passage 7, to annular notch 8 and annular gas cutting slot 9 and against plate or connection detail 10 that is to be pierced at 11. A circular water cooling passageway 18 cools the block. The bottom of body 1 is fitted with a non-conducting, contacting ceramic ring 191. The plate or detail shape 10 has welding beads or ridges 192 as set forth in this applicant's co-pending application #563,662 and subsequent divisional application #856,632. Set within the body casting 1 is a carbon sleeve 13 to direct the oxygen downward against plate, to protect casting against the heated exhaust, and to form a vertical cylindrical exhaust passage 12 for the upward disposal of the hot gases and slag. A plurality of electric current terminals 63 form one leg of an electric circuit formed between said block and a similar opposite block which serves as a support block for the plates 10 and 193 being pierced. Said support block 191' may serve as an opposite force, and as pierced holes are made through all of the plates the final waste, slag, and gases for upper flame punching the plates pass downwardly and cut through a receiving hole 191 on the opposite lower block 191'.

In operation, beaded structural details 10 are inserted in magnetized slots (not shown) of punching blocks 1 and 1' and the blocks are forcibly closed against opposite sides of the web of the shape or plate 193. A carbon arc may be struck between carbon sleeve 13 and steel plates 10 and 193 and the lower block 1' preferably having a carbon sleeve 13' as alternating or other current is impressed across the assemblage. As the steel heats, the three pieces of steel would be tack welded by means of the beads resulting in an electric resistance forge weld. As the steel heats close to a white heat, oxygen is turned on under fairly high pressure sufficient to sustain and intensify the combustion of the steel, the current is turned off and the products of combustion leave through the central exhaust tube. With burning area effectively closed by the products of combustion, the steel with the continued feeding of combustion supporting oxygen, will continue to oxidize rapidly, and is blown out by the said high pressure stream helped by the indirect draft mentioned hereinbefore.

The problems of flash-back, pressures, mixing and those attendant on the handling of combustible gases are thus eliminated.

Furthermore, many of the devices and apparatus shown can be used for other operations and purposes simply by changing the procedure, manipulations, and the accessories used. With slight modifications, still other operations are possible. For example, block 1 of FIGURE 2 may be used as a spot flame welder by using only the mixed heating gases with reasonable forging pressure provided by the sleeve 27. Also, with the top plate 10 flame punched to a diameter smaller than the internal diameter of the sleeve 27, the block 1 can be used to melt down the top edge of the hole of the upper plate 10 into the hole and to weld the plate 10 to the lower plate forming a peripheral fillet weld, that is good, visual, inspectional check of the proper weld. Also, with multiple filler wire or rod fed into the welding area through the casting body 1 and slot 9 or through thickened sleeve 13, the block can be used with heating gases as a plug welder to fill holes punched into upper plates resting upon a third unpunched plate that is backed up by a carbon ram or supporting platen.

It will also be apparent that mechanical multiple drilling can be substituted for the flame-punching of the combined operation of flame-punching and welding. All of these apparent and anticipated variations in the present invention, are intended to form a part of the present invention.

It will now be recognized that a novel, practical, specific, and highly integrated machine and method has been set forth in the specification which is capable of fabricating a wide and restricted class of structural steel fabricating shapes. This apparatus is flexible, versatile, accurate, and economical, eliminating many operations, requiring a minimum amount of floor space, and adaptable for use with all types of welding, heating, and fastening apparatus, leading up to the complete finished fabrication of the structural shapes in a single pass through the apparatus. This apparatus also eliminates the necessity of providing cumbersome masks, goggles, and hoods, for protecting the eyes of the operators from the glare of welding flames.

While various changes may be made in the detail construction, it shall be understood that such changes shall be within the spirit and scope of the present invention as defined by the appended claims.

What I claim as new and desire to protect by Letters Patent of the United States is:

1. A flame-punching hole cutting device comprising a heat conductive body having a vertical exhaust hole, combustible gas inlet means, circular distributing duct means and radial passage means leading from the inlet port means to the vertical exhaust hole, combustion-supporting gas inlet port means and a manifold means feeding the combustion-supporting gas to said radial passage means, a heat-resistant inner tube concentrically-fitted into the vertical exhaust hole of the body and extending upwardly from a point just above the bottom end of the body and providing in cooperation with the wall of the exhaust hole an annular heating and gas cutting slot open at its lower end and communicating at its upper end with said radial passage means, the space below the lower end of the inner tube providing a burning chamber in which the gases will be mixed and ignited and directed against the metal to be pierced from the heating-cutting slot to effect the initial localized heating action of the metal plates to a high temperature prior to the gas cutting action, the waste products resulting from the heating and gas cutting action being exhausted from the burning chamber through heat resistant tube.

2. A flame-punching hole cutting device according to claim 1, and induced air draft means carried in said heat resistant inner tube for directed upwardly and outwardly compressed air to effect rapid removal of the waste products from the burning chamber.

3. A flame-punching hole cutting device according to claim 1, and said heat conductive body having water passages, cooling water inlet means leading to said water passages and water outlet means leading from the passages of the body.

4. A flame-punching hole cutting device according to claim 1, and a narrow projecting electrically conductive heat resistant welding ring means depending from the bottom face of said conductive body to engage the metal plates and defining the boundary wall of the gas cutting slot, a corresponding heat resistant welding ring means of opposite polarity opposingly engaging the metal plates to establish a heat welding circuit therethrough.

5. A flame-punching hole cutting device as defined in claim 1, and means for supporting said body for adjustable movement relative to the metal work between operating and non-operating positions and means for applying pressure to retain the body against the metal work in its operating position.

6. A flame-punching hole cutting device for piercing metal comprising an electrically conductive body having a vertical exhaust hole, manifold means for receiving and distributing combustion-supporting gases, an electrically conductive inner sleeve fitted into the exhaust hole and providing in cooperation with the wall surface of the exhaust hole an annular slot communicating with said manifold means for delivering downwardly an annular sheet of combustion-supporting gas against the work metal, electric terminal means connected to said conductive body and forming one leg of an electrical circuit that continues through said inner sleeve, said inner sleeve providing an electric arc heating means depending into the exhaust hole, non-conductive means projecting from the bottom face of said electrically conductive body to support the arc heating means and said body above the metal work surface, said arc heating means serving to initiate and bring the metal to a white heat so that combustion of the work will be sustained and intensified by the application of the combustion-supporting gas, a support block of opposite electric polarity serving to provide an opposite force against the work metal and having a receiving hole outlining a gas cutting slot effected by the combustion supporting gas, the products of combustion being exhausted through the inner sleeve and vertical exhaust hole of the conductive body and the slag and waste being passed through the receiving hole of the support block.

References Cited in the file of this patent

UNITED STATES PATENTS

| | | |
|---|---|---|
| 1,672,092 | Russell | June 5, 1928 |
| 1,715,694 | Coddington | June 4, 1929 |
| 1,883,964 | Kramer | Oct. 25, 1932 |
| 2,404,019 | Yock | July 16, 1946 |
| 2,494,994 | Gamallo | Jan. 17, 1950 |
| 2,517,622 | Babcock | Aug. 8, 1950 |
| 2,527,490 | Adams | Oct. 24, 1950 |
| 2,881,527 | Walter | Apr. 14, 1959 |
| 2,903,561 | Rively | Sept. 8, 1959 |
| 2,914,856 | Fitzpatrick | Dec. 1, 1959 |
| 2,929,914 | Ely | Mar. 22, 1960 |

FOREIGN PATENTS

| | | |
|---|---|---|
| 595,941 | Germany | July 25, 1934 |